(12) United States Patent
Anderson et al.

(10) Patent No.: US 11,488,638 B1
(45) Date of Patent: Nov. 1, 2022

(54) DEVICE TO TRANSFER MULTIPLE STORAGE DRIVES FROM ONE STORAGE SERVER TO ANOTHER

(71) Applicant: ZT Group Int'l, Inc., Secaucus, NJ (US)

(72) Inventors: Paul Harold Anderson, Cedar Park, TX (US); Jared Harlan, Hutto, TX (US)

(73) Assignee: ZT Group Int'l, Inc., Secaucus, NJ (US)

( * ) Notice: Subject to any disclaimer, the term of this patent is extended or adjusted under 35 U.S.C. 154(b) by 21 days.

(21) Appl. No.: 17/181,407

(22) Filed: Feb. 22, 2021

(51) Int. Cl.
   *G11B 33/12* (2006.01)
   *G06F 1/18* (2006.01)

(52) U.S. Cl.
   CPC ............ *G11B 33/124* (2013.01); *G06F 1/187* (2013.01)

(58) Field of Classification Search
   None
   See application file for complete search history.

(56) References Cited

U.S. PATENT DOCUMENTS

| | | | |
|---|---|---|---|
| 7,200,004 B2* | 4/2007 | Chen et al. | G06F 1/188 361/679.39 |
| 9,727,099 B1* | 8/2017 | Hastings et al. | G06F 1/187 |
| 2015/0043152 A1* | 2/2015 | Zhang et al. | G11B 33/124 361/679.37 |
| 2015/0043153 A1* | 2/2015 | Zhang et al. | G11B 33/124 361/679.39 |

* cited by examiner

*Primary Examiner* — Craig A. Renner
(74) *Attorney, Agent, or Firm* — Dergosits & Noah LLP; Todd A. Noah (57) ABSTRACT

An apparatus is provided for the simultaneous transferring of multiple storage devices from a chassis to reduce service time and associated server temperature fluctuations. The storage transfer device may be mounted to a chassis with a multitude of electronic devices, e.g., a JBOD with HDDs, above the devices to be removed. The storage device may then be manipulated to mechanically unlatch the devices from the chassis and simultaneously attach the devices to the transfer device. The devices may then be disconnected and withdrawn from the chassis and pulled into the storage transfer device. The devices may be re-installed later using the storage device and the reverse process.

13 Claims, 12 Drawing Sheets

DEVICE TO TRANSFER MULTIPLE STORAGE DRIVES FROM ONE STORAGE SERVER TO ANOTHER

BACKGROUND

Servers, e.g., just a bunch of drive (JBOD) storage servers, may contain a hundred or more electronic devices, such as HDDs. At times the devices may need to be transferred from the chassis to a different storage fixture, e.g., for the service of certain parts of a JBOD. Because of the number of devices, the transfer process is usually tedious and time-consuming, especially if done as a single HDD at a time for a JBOD.

As a result, service times requiring the removal of a number of drives are unnecessarily long. Furthermore, as a result of long service times, hot swap servicing, servicing of the server while it is in operation, of numerous HDDs may cause undesired transient thermal situations in which components exceed data sheet temperature maximums.

Thus, what is needed is an apparatus that provides the capability to remove and subsequently re-install multiple electronic devices at the same time.

BRIEF DESCRIPTION OF THE DRAWINGS

The embodiments are illustrated by way of example and not limitation in the accompanying drawings, in which like references indicate similar elements, and in which.

DETAILED DESCRIPTION

Embodiments described within disclose a transfer device, e.g., a drive transfer device (DTD) for use with HDDs within a JBOD, that may be used to remove and transfer multiple devices simultaneously from a chassis. The embodiments may also be used to simultaneously install multiple devices into the chassis. Thus, long service times and undesired transient thermal situations may be reduced.

In embodiments, the DTD may be used to transfer the drives to a storage fixture, e.g., an unused server chassis, and may be fabricated from a metal, such as sheet steel, or other types of suitable material, including plastic.

In the following description, embodiments are described with respect to an apparatus for transferring HDDs from a JBOD. However, one of skill will understand that the subject matter may be applied to different types of electronic devices, and different numbers of electronic devices, installed in different types of housings or chassis. For example, the size of the DTD may be adapted to accommodate an arbitrary number of HDDs, i.e. two (2) HDDs up to ten (10) or more. Thus, embodiments may also be used to transfer other types of electronic devices from other types of chassis.

To extract HDDs from a JBOD, embodiments of a DTD may be temporarily mounted to a JBOD above the HDDs to be removed. The DTD may be manipulated to mechanically unlatch the HDDs from the JBOD and simultaneously attach the HDDs to the DTD. The HDDs may then be pulled vertically and withdrawn from the server chassis. This process also disengages the HDDs electrically from the associated circuit board with no additional steps. The DTD, with the attached HDDs, may then be disengaged from the JBOD. The DTD may then be transferred to the storage fixture and mounted to the storage fixture in the same manner it was mounted to the JBOD. The HDDs may then be pushed downward into the storage fixture. The DTD may be manipulated to release the HDDs and the DTD removed. The HDDs may be mechanically latched into the storage fixture, completing the process to transferring the HDDs from the JBOD to the storage fixture is complete. In embodiments, the process for transferring the HDDs from the storage fixture to their installation in the JBOD is the reverse of the extraction procedure.

Figure 1:
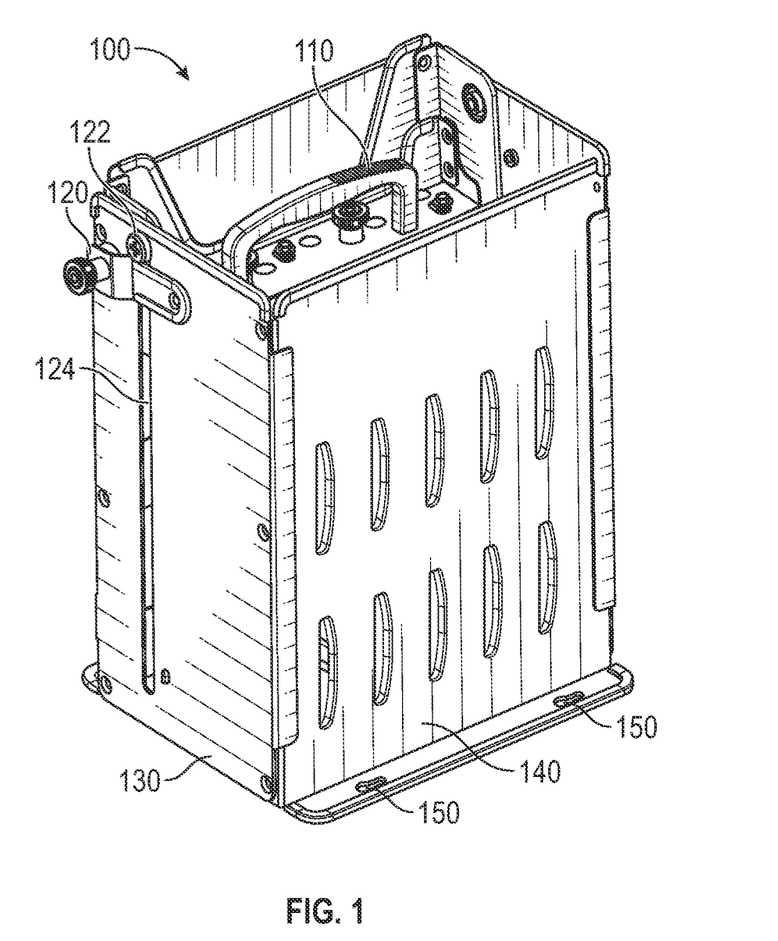
FIG. 1 is an upper left perspective view of an embodiment of a device for transferring multiple drives.

FIG. 1 is an upper left perspective view of an embodiment of a drive transfer device (DTD) 100. In the embodiment of FIG. 1, DTD 100 includes a slider assembly 110 that slides vertically within a chassis 130. Slider assembly 110 includes posts 122 that ride within slots 124 of chassis 130 and guide assembly 110 in the vertical motion from the raised, extraction position shown to a lowered, insertion position (see FIG. 3A). Slider assembly 110 may be retained in the raised extraction position by fixing a slider lock 120 across slot 124, which traps post 122 and prevents slider assembly 110 from descending. A front panel 140 of chassis 130 may be provided with a flange with alignment slots 150, which may be used to mount DTD 100 to a server chassis.

Figure 2:
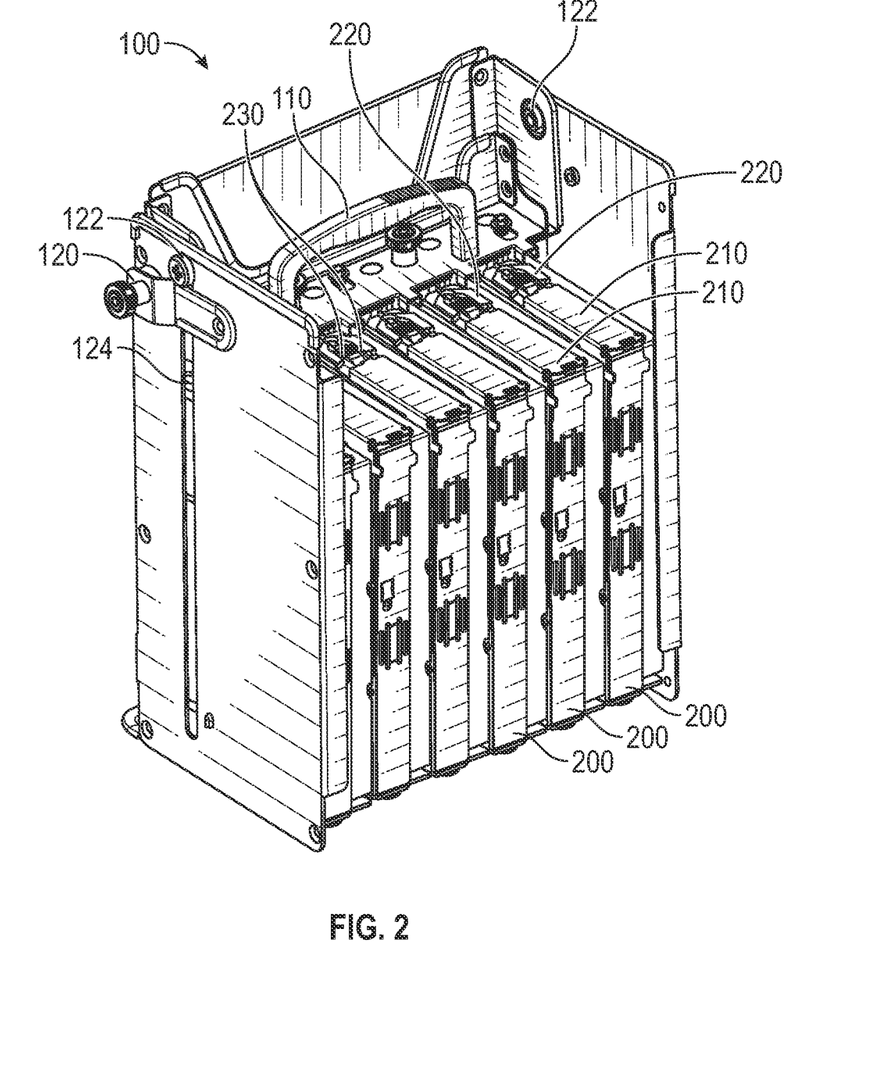
FIG. 2 is an upper left perspective view of elements of an embodiment of a device for transferring multiple drives.

FIG. 2 is an upper left perspective view of elements of DTD with front panel 140 removed to illustrate interior elements. FIG. 2 illustrates slider assembly 110 in the extraction position, yet also detached from device carriers 200, each of which contains a drive, e.g., an HDD. Device carriers 200 each include a storage carrier latch 210 shown in a closed position. Storage carrier latch 210 is hinged at the corner of the device carrier and is retained in the closed position by a trigger tooth 240 (FIG. 7) of a storage carrier trigger 220. Storage carrier trigger 220 includes slots 230 that may be used to force trigger 220 to release latch 210, which will be described further within. Storage carrier latch 210 further includes a latch prong (or "tine" or "tooth") 250. With latch 210 in the closed position shown, latch prong 250 is in an extended position that may engage a striker element (not shown) of server chassis 30 (FIG. 3A) and retain device carrier 200 in place within the server chassis.

Figure 3A:
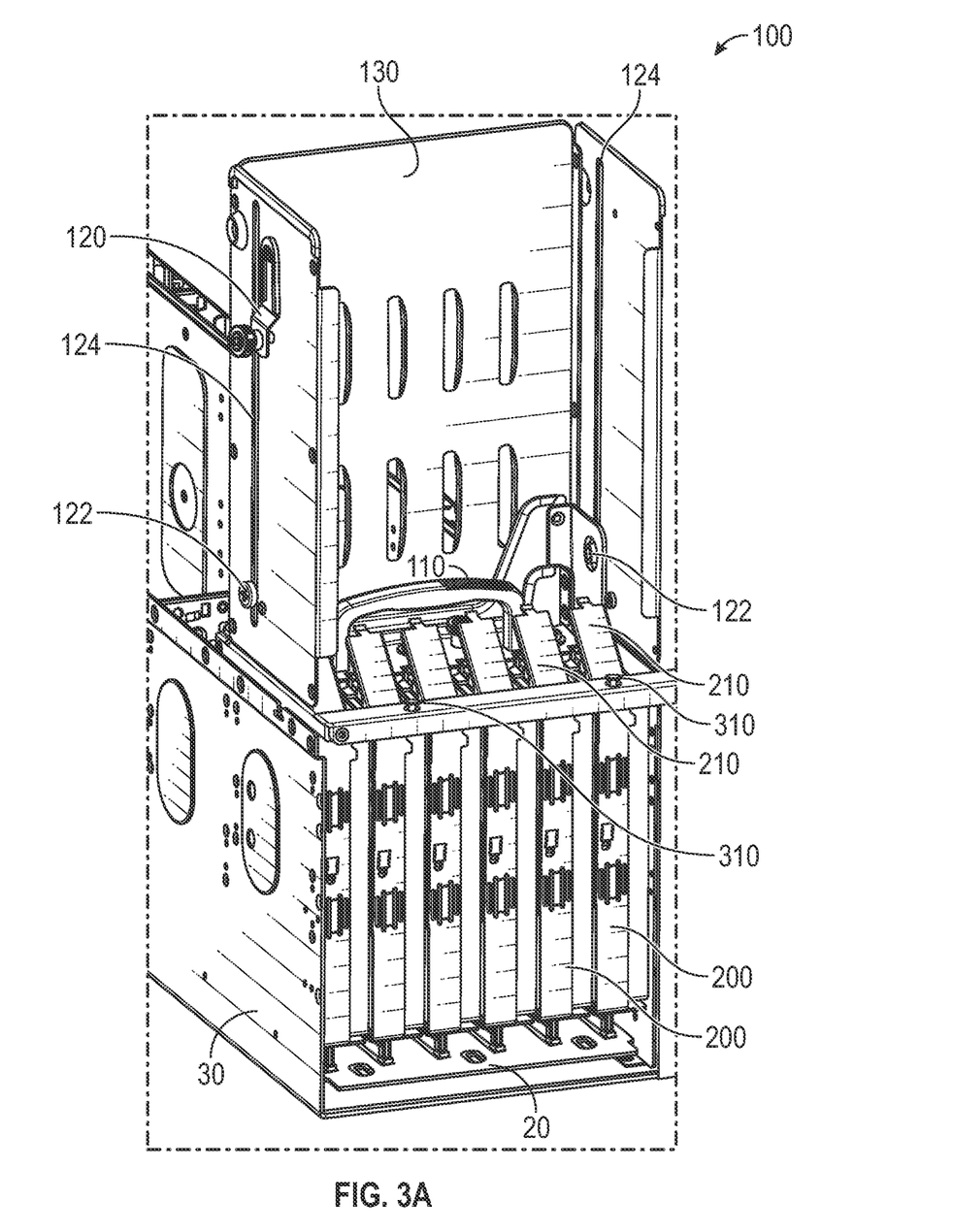
FIG. 3A is an upper left perspective view of elements of an embodiment of a device for transferring multiple drives in a first configuration.

FIG. 3A is an upper left perspective view of elements of DTD 100 mounted atop a server chassis 30 with slider assembly 110 in the lowered insertion position. To mount DTD 100 to chassis 30, slots 150 (not shown in FIG. 3A) of front plate 140 may engage T-nuts 310 attached to chassis 30.

In some embodiments and chassis positions, T-nuts 310 may not be present. As a result, slots 150 are not relied upon to position DTD 100. In such cases, DTD chassis 130 may be visually aligned with device carriers 200.

In FIG. 3A, HDDs contained by device carriers 200 are connected to a circuit board 20. However, device latches 210 are angled upward, which indicates they are in the unlatched position. As a result, each device carrier 200 may be raised by slider assembly 110 and disconnected from circuit board 20.

Figure 3B:
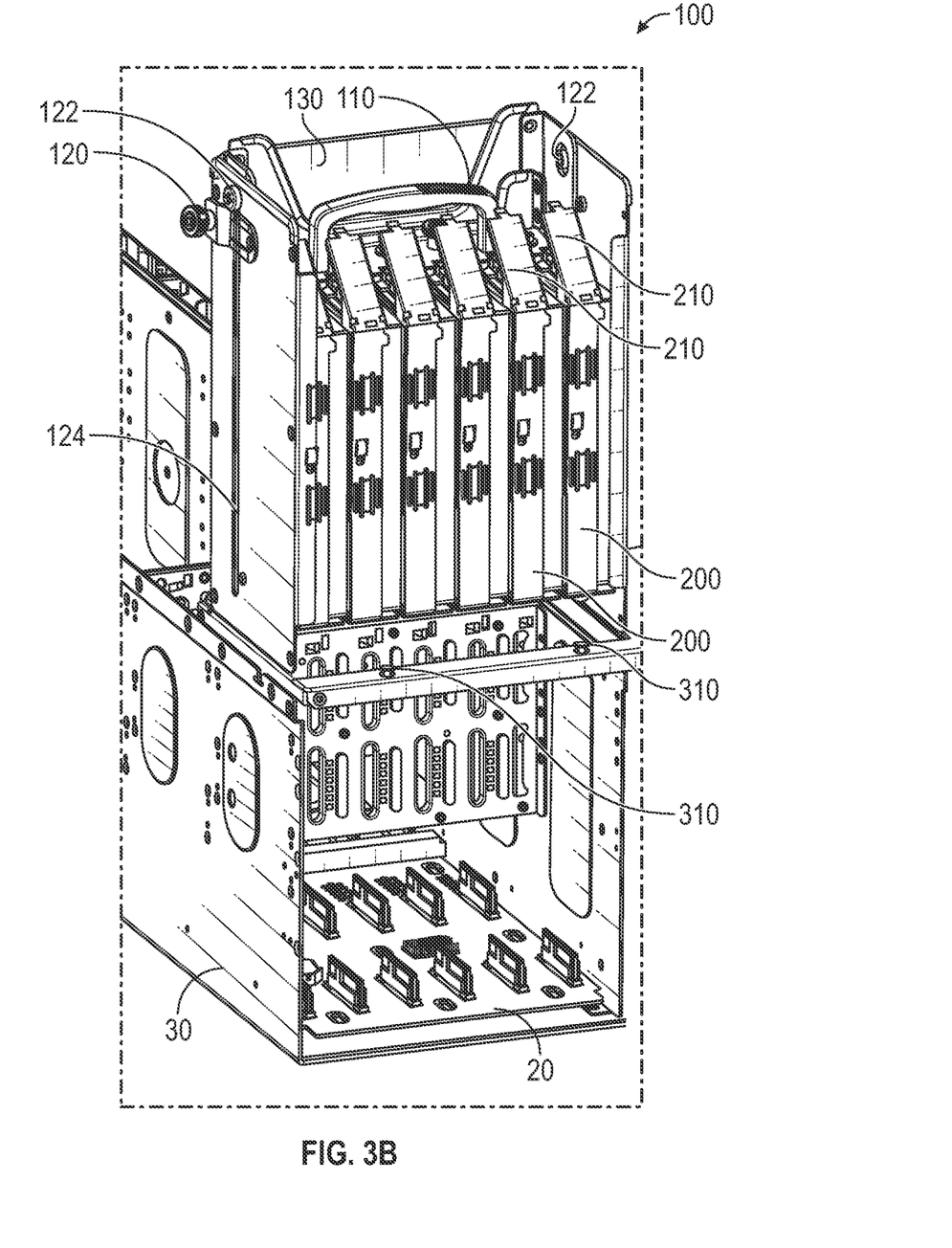
FIG. 3B is an upper left perspective view of elements of an embodiment of a device for transferring multiple drives in a second configuration.

FIG. 3B is an upper left perspective view of elements of an embodiment of DTD 100 mounted atop server chassis 30 with slider assembly 110 in the raised extraction position. To extract carrier devices 200 from server chassis 30, a handle (400, FIG. 4A) of slider assembly 110 was used to simultaneously pull carriers devices 200, disengaging the HDDs from circuit board 20 and extracting them from server chassis 30 into DTD 100. Slider lock 120 was then fixed across slot 124 to secure slider assembly 110 in the extracted position.

Figure 4A:
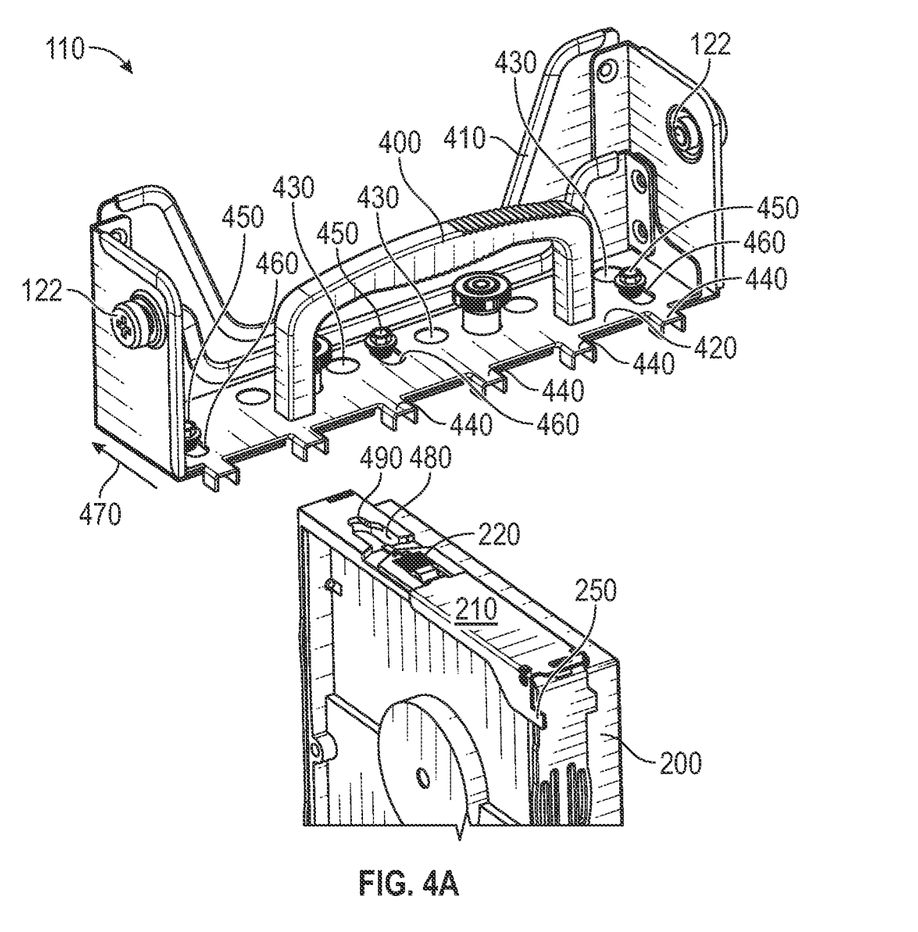
FIG. 4A is an upper left perspective view of elements of an embodiment of a device for transferring multiple drives.

FIG. 4A is an upper left perspective view of an embodiment of a slider assembly. In FIG. 4A, slider assembly 110 is shown to include an outer carriage 410. Outer carriage 410 includes posts or bolts 122 that move within slots 124. Thus outer carriage 410 is constrained to move in the direction of slots 124 within DTD chassis 130. Slider assembly 110 is also shown to include an inner carriage 420. Inner carriage 420 includes handle 400 attached to a base plate that includes guide slots 460. Guide fasteners 450 attach outer carriage 410 to inner carriage 420 and guide slots 460 constrain the movement of fasteners 450 such that inner carriage 420 moves in direction 470 (or the reverse direction) with respect to outer carriage 410.

Figure 4B:
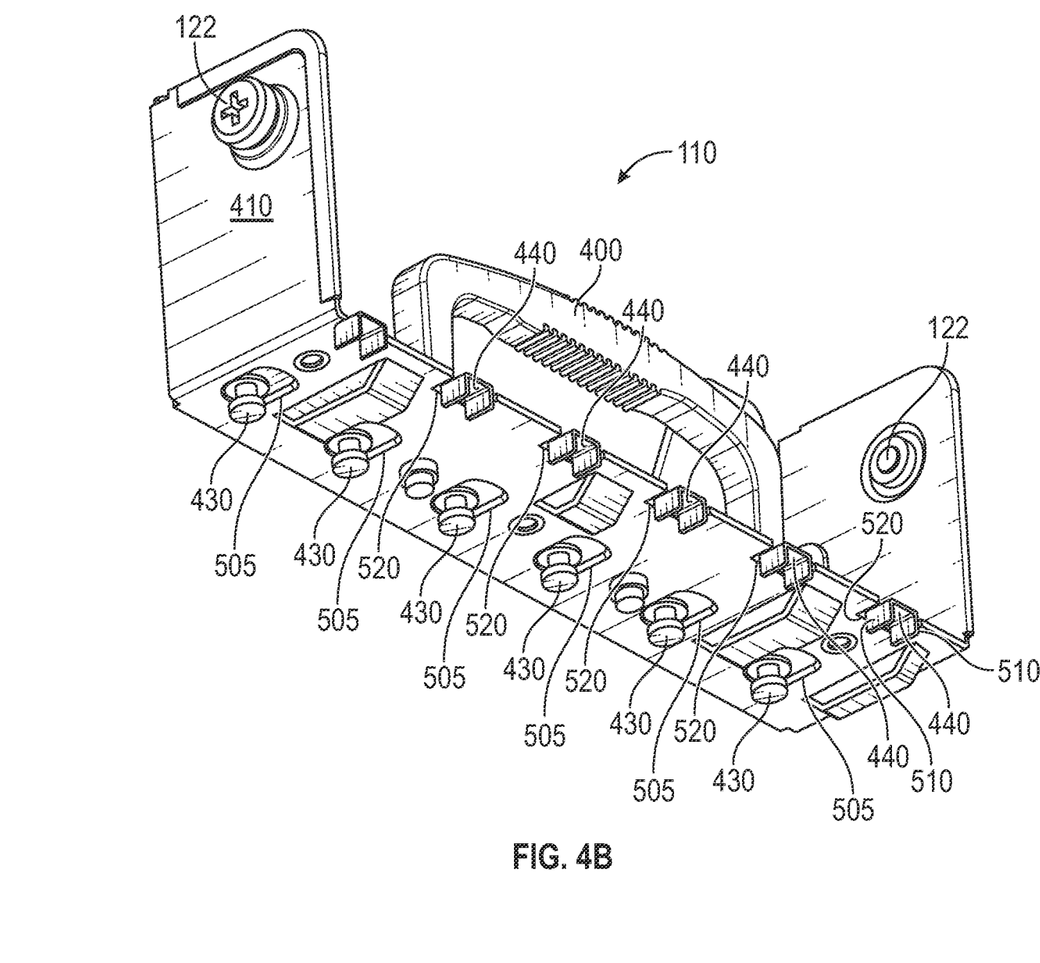
FIG. 4B is a lower left perspective view of elements of an embodiment of a device for transferring multiple drives.

Inner carriage 420 includes T-pins 430 (showing an end of T-pin 430 in FIG. 4A and the engaging lip or head of T-pin 430 in FIG. 4B) and trigger releases 440. T-pins 430 and trigger releases 440 move in unison with inner carriage 420 in direction 470. Each T-pin 430 and trigger release 440 is disposed on inner carriage 420 so that when outer carriage 410 is lowered to the extraction position, and inner carriage 420 is in extended position, for each device carrier 200, a T-pin 430 is received by slot 480 and prongs 510 (FIG. 4B) of a trigger release 440 are received by slots 505 (FIG. 4B). Then, when inner carriage 420 is moved in direction 470 to the retracted position, T-pin 430 moves from entry slot 480 to a T-pin seat 490 and prongs 510 move latch trigger 220 away from latch 210, allowing latch 210 to spring up and open and latch prong 250 to disengage from chassis 30.

FIG. 4B is a lower left perspective view of an embodiment of a slider assembly. FIG. 4B illustrates slider assembly 110 with inner carriage moved to the retracted position with respect to outer carriage 420. In FIG. 4B, T-pins 430 attached to inner carriage 420 are shown to protrude through and move within access slots 505 in outer carriage 410. Each trigger release 440 is shown to be received by cutouts 520 within outer carriage 420.

Figure 5:
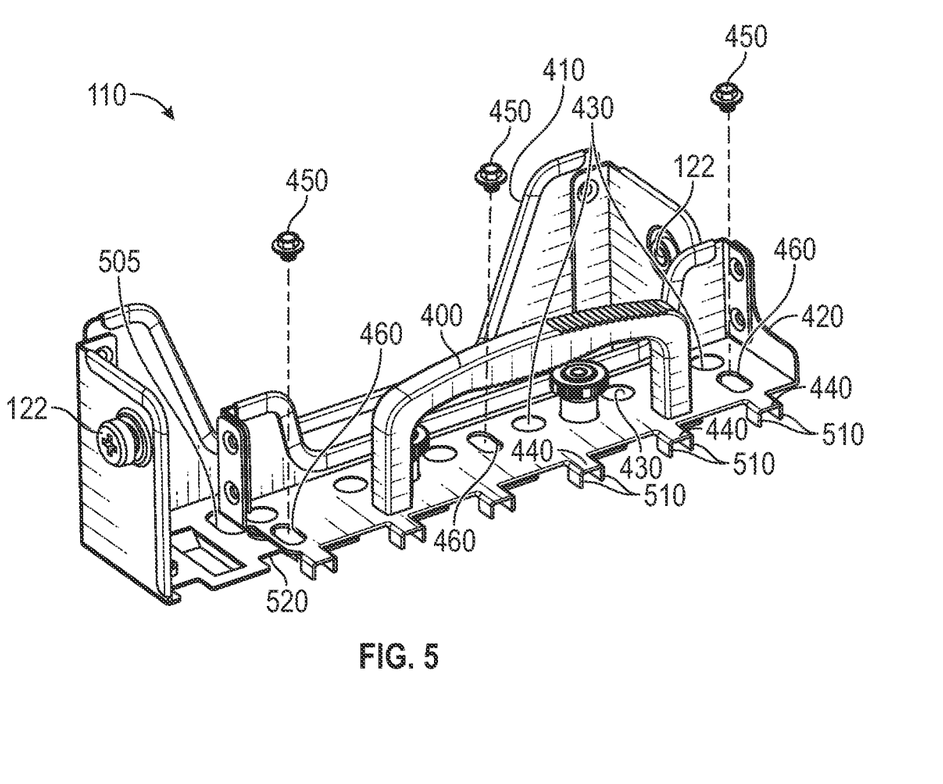
FIG. 5 is an upper left perspective view of disassembled elements of an embodiment of a device for transferring multiple drives.

FIG. 5 is an upper left perspective view of disassembled elements of a slider assembly. In FIG. 5, slider assembly 110 is shown with inner carriage 420 displaced from outer carriage 410. To re-assemble, fasteners 450 are extended through slots 460 and connected to outer carriage 410. FIG. 5 further illustrates that prongs 510 of trigger releases 440 extending downward from inner carriage 420. One of skill will understand that in embodiments the number and shape of prongs 510 may be varied as necessary to engage with latch trigger 220, and that release prongs and latch triggers of different geometries are envisioned and considered to be within the scope of the teachings of this specification. Similarly, one of skill will understand that in embodiments different geometries of hooks may be used to engage a lip of slot 490, and that different geometries may be used to create a lip that might be engaged to extract device carrier 200.

Figure 6:
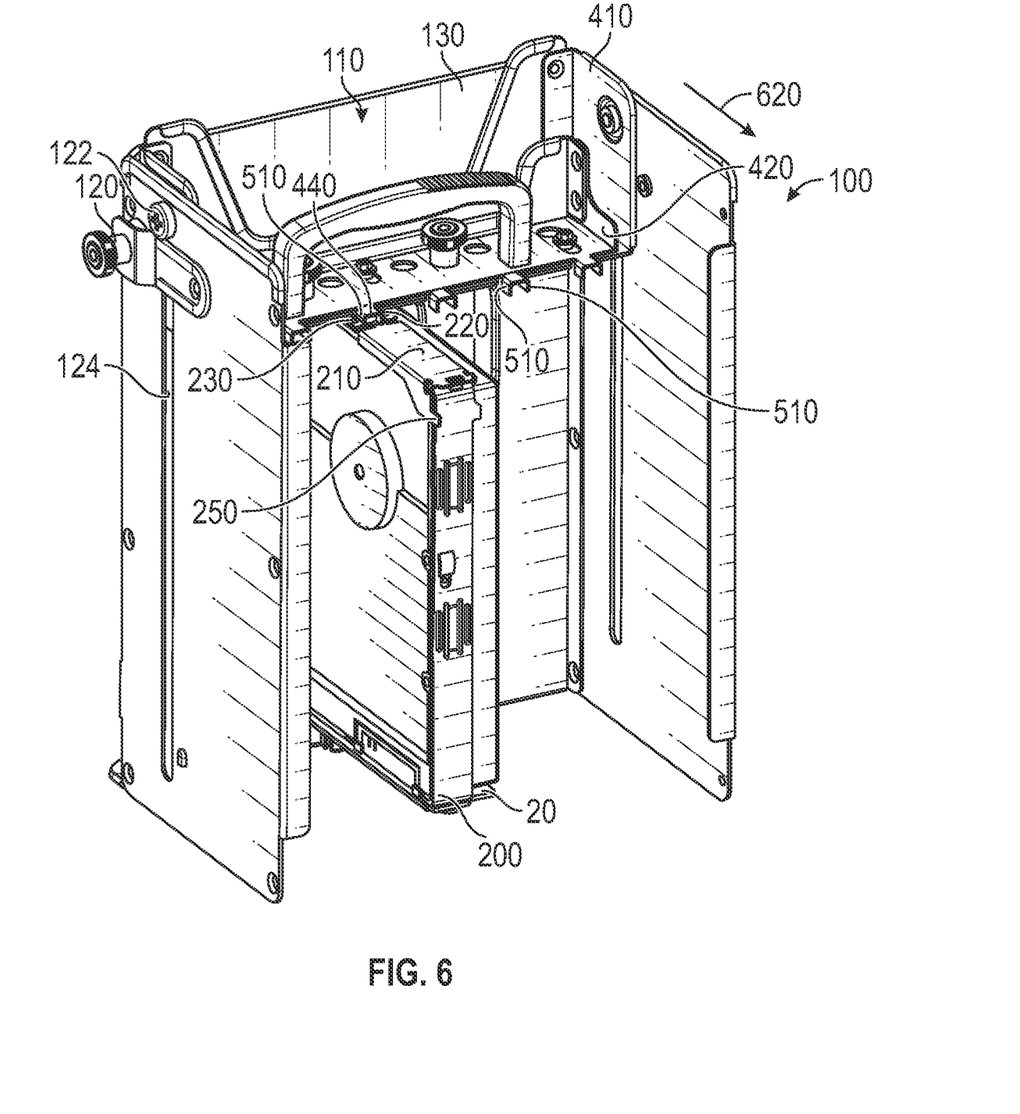
FIG. 6 is an upper left perspective view of elements of an embodiment of a device for transferring multiple drives.

FIG. 6 is an upper left perspective view of elements of an embodiment of DTD 100. In FIG. 6, slider assembly 110 is in the raised extraction position and inner carriage 420 is in the extended position, moved in direction 620 with respect to inner carriage 610. Prongs 510 are shown inserted into trigger recesses 230. As shown, latch trigger 220 is not in the release position and latch 210 is still fully latched. Thus, latch prong 250 is extended. In this extended position latch prong 250 would prevent the installation of carrier device 200 because latch prong 250 would contact elements of chassis 30 prematurely. Thus, to install carrier device 200, inner carriage 420 must be moved in the direction opposition of 620 to the retracted position. That movement would cause prongs 510 to move trigger 220 and release latch 210. Latch 210 would then pivot upward according to the bias of, e.g., spring-loaded hinges and prong 250 would retract. Also, though it is not visible in FIG. 6, with the movement of inner carriage 420 to the retracted position, T-nut 430 would move from entry slot 480 to seat 490. With T-nut 430 engaging the lip of seat 490, T-nut 430 would thus be connected to device carrier 200 and the connection would allow slider assembly 110 to be used to lower carrier device 200 into chassis 30.

Figure 7:
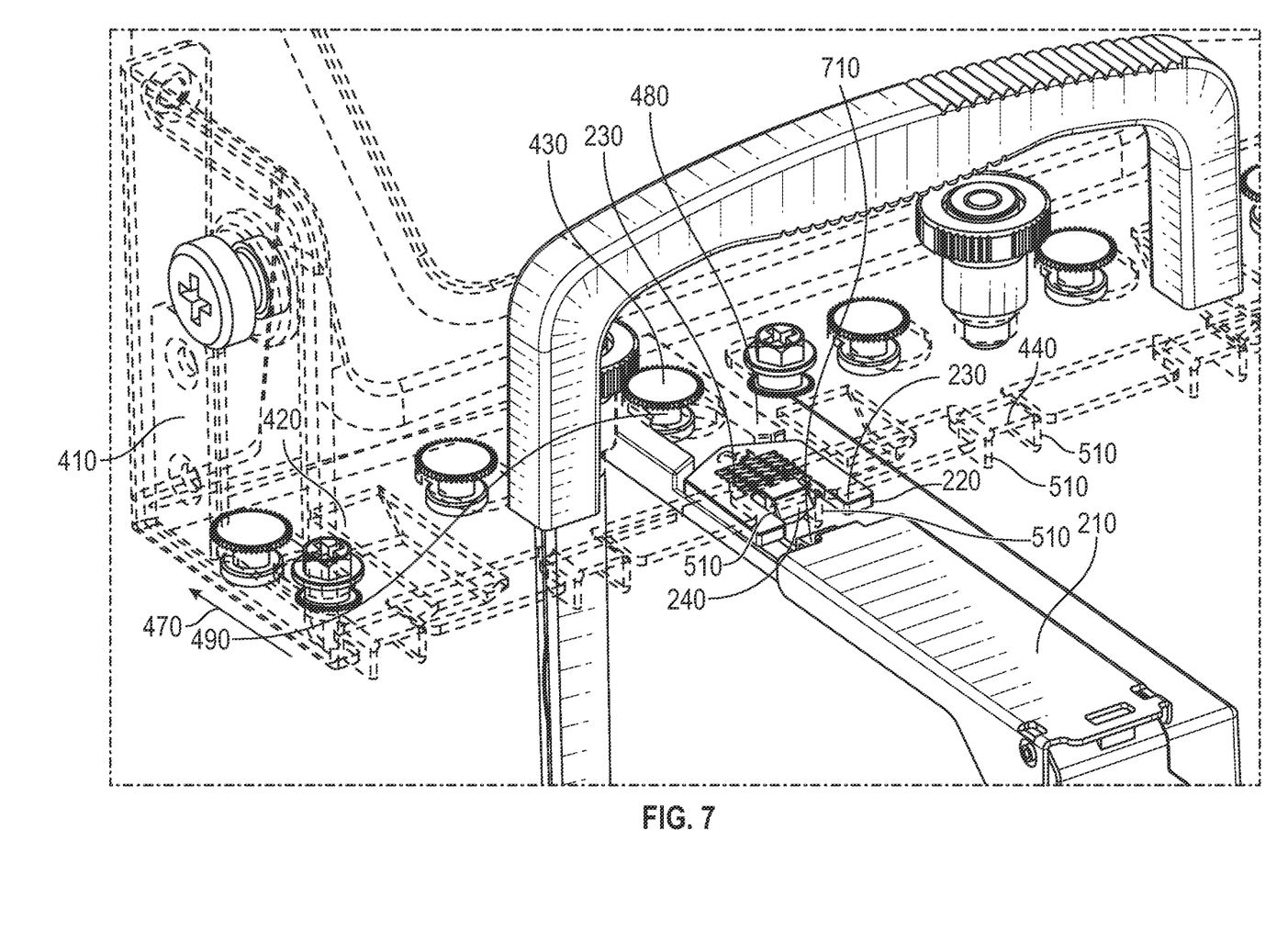
FIG. 7 is a partially transparent upper left perspective view of elements of an embodiment of a device for transferring multiple drives.

FIG. 7 is a partially transparent upper left perspective view of elements of an embodiment of a device for transferring multiple drives. In FIG. 7, inner carriage 420 is shown in the retracted position after motion in direction 470 with respect to outer carriage 410. Similarly, trigger 220 is shown withdrawn to a released position by prongs 510. Latch 210 is shown to include a catch 710 that is configured to engage tooth 240 of trigger 220 and retain latch 210 in the latched position. Since, as shown, tooth 240 and catch 710 are not engaged, in this configuration latch 210 may spring open by the action of a spring-loaded hinge (not shown), or other device, such as a leaf spring (not shown) beneath latch 210. Also, FIG. 7 illustrates T-nut 430 seated within seat 490 such that the head of T-nut 430 engages a lip of seat 490. With T-nut 430 seated in this manner carrier device 200 may be raised and lowered by the vertical movement of slider assembly 110.

Figure 8:
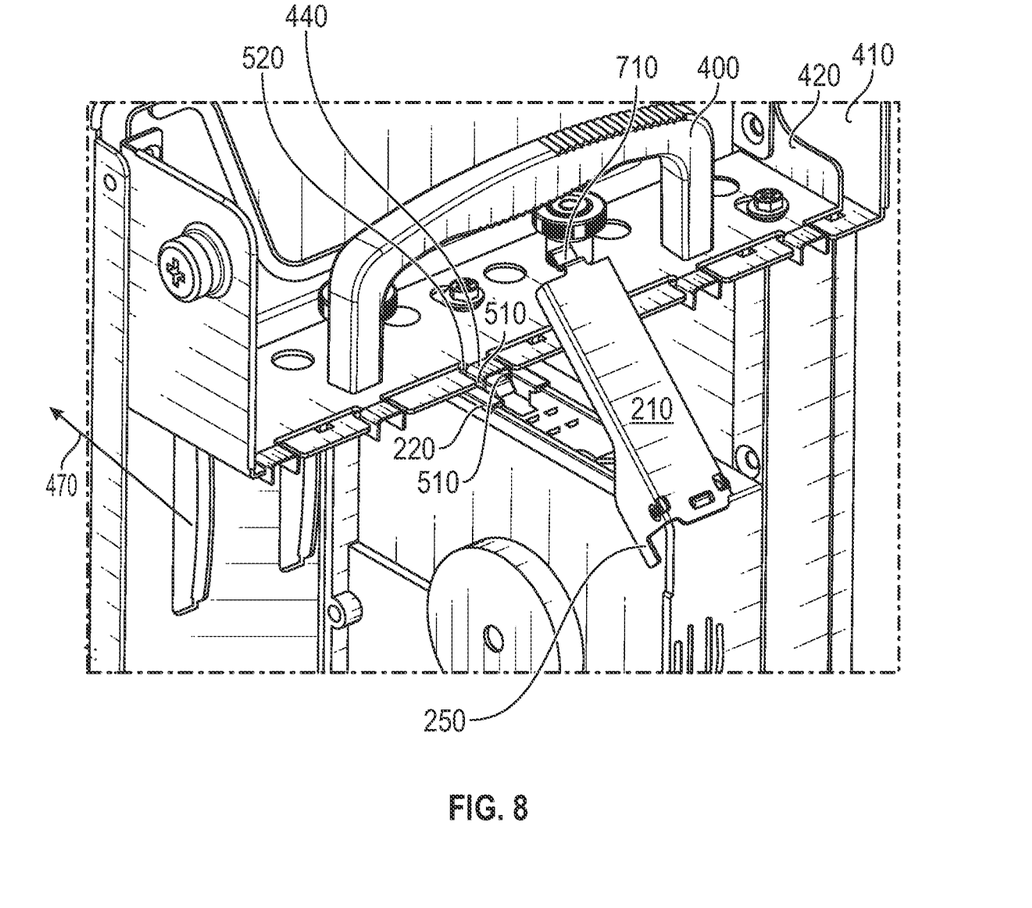
FIG. 8 is an upper left perspective view of elements of an embodiment of a device for transferring multiple drives.

FIG. 8 is an upper left perspective view of elements of an embodiment of a device for transferring multiple drives. In FIG. 8, as in FIG. 7, inner carriage 420 is shown in the retracted position after motion in direction 470 with respect to outer carriage 410 and trigger 220 is shown withdrawn to a released position by prongs 510. However, FIG. 8 illustrates the movement of latch 210 after being released by trigger 220. Latch 210 has sprung open by the action of a spring-loaded hinge (not shown), or other device, such as a leaf spring (not shown) beneath latch 210. As a result, prong 250 is recessed and would not interfere with chassis 30 during the installation of carrier device 220.

Figure 9A:
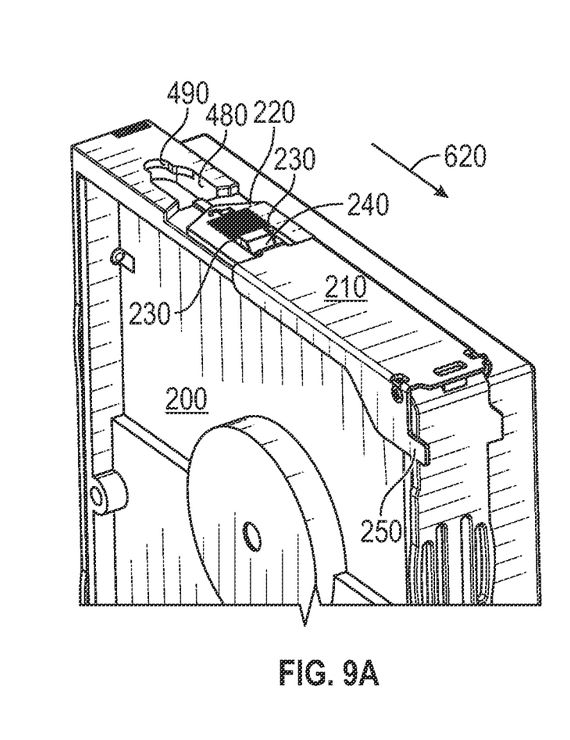
FIG. 9A is an upper left perspective view of elements of an embodiment of a device for transferring multiple drives in a first configuration.

FIG. 9A is an upper left perspective view of elements of an embodiment of a carrier device 220. In FIG. 9A, trigger 200 is shown in the engaged position, moved in direction 620 with respect to latch 210. In this position, catch 710 (not shown) is retained by tooth 240 and latch prong 250 is in an extended position that would interfere with chassis 30 during the installation of carrier device 220.

Figure 9B:
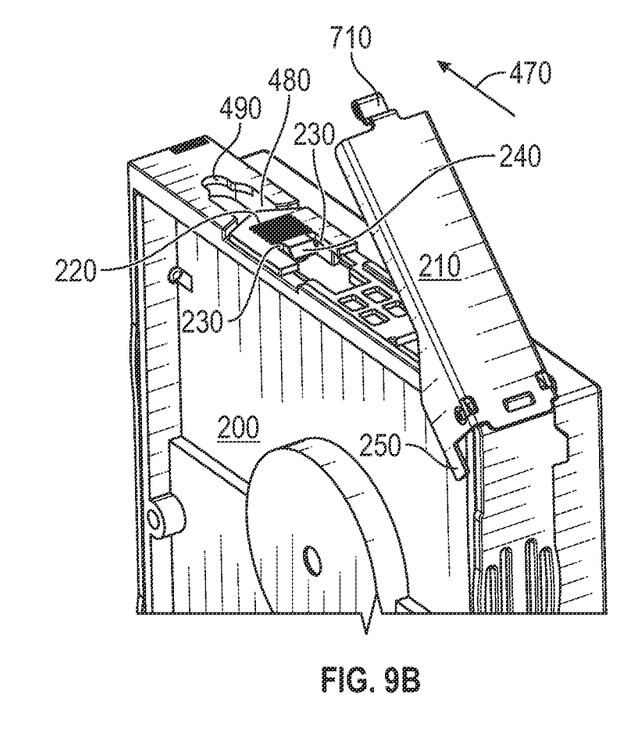
FIG. 9B is an upper left perspective view of elements of an embodiment of a device for transferring multiple drives in a second configuration.

FIG. 9B is an upper left perspective view of elements of an embodiment of a carrier device 220. In FIG. 9B, trigger 200 is shown in the retracted position, moved in direction 470 with respect to latch 210. In this position, catch 710 has been released by tooth 240 and latch prong 250 is in a recessed position that would not interfere with chassis 30 during the installation of carrier device 220.

Figure 10A:
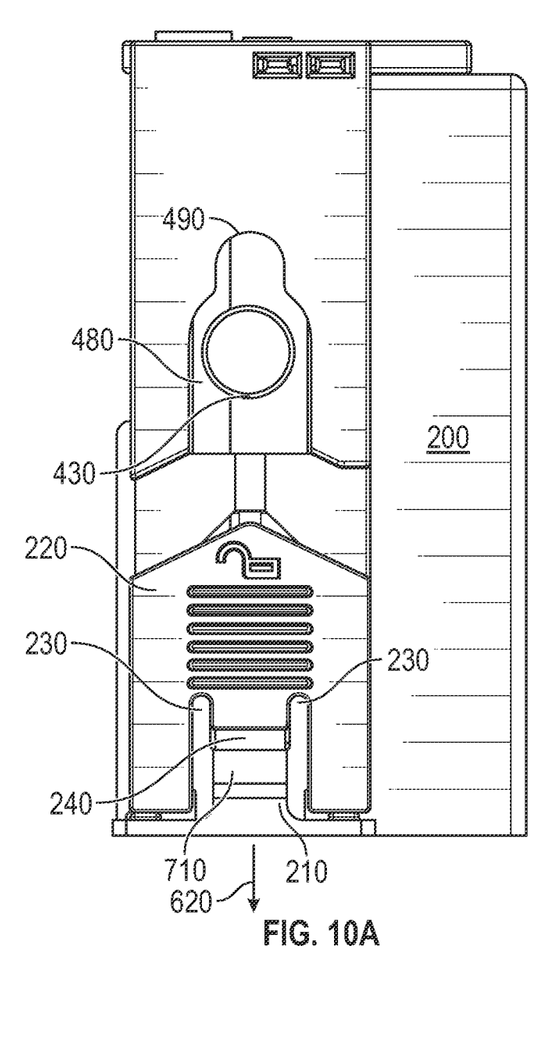
FIG. 10A is a top view of elements of an embodiment of a device for transferring multiple drives in a first configuration.

FIG. 10A is a top view of elements of elements of an embodiment of a carrier device 220. In FIG. 10A, trigger 200 is shown in the engaged position, moved in direction 620 with respect to latch 210. In this position, catch 710 is retained by tooth 240. T-nut 430 (showing only the outline of the head of T-nut 430 for clarity) is received within entry slot 480. As shown, T-nut 430 is not retained by seat 490 and carrier device 200 is not yet attached to slider assembly 110.

Figure 10B:
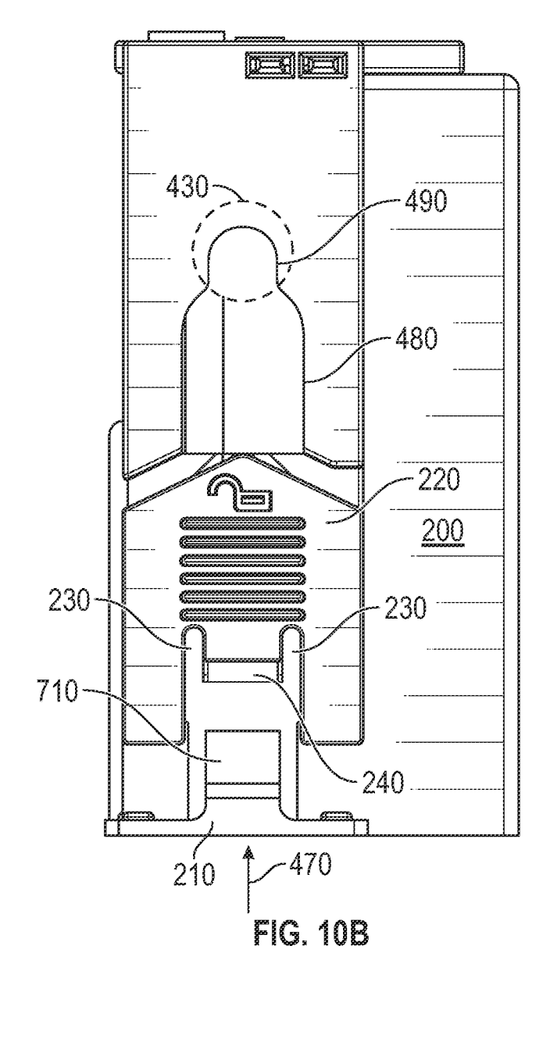
FIG. 10B is a top view of elements of an embodiment of a device for transferring multiple drives in a second configuration.

FIG. 10B is a top view of elements of elements of an embodiment of a carrier device 220. In FIG. 10B, trigger 200 is shown in the dis-engaged position, moved in direction 470 with respect to latch 210. In this position, catch 710 is not retained by tooth 240. T-nut 430 (showing only the outline of the head of T-nut 430 for clarity) is received within seat 490. As shown, the head of T-nut 430 engages the lip of seat 490 and is retained by seat 490. Thus, carrier device 200 is attached to slider assembly 110 and may be raised or lowered using slider assembly 110.

The previous description is provided to enable any person skilled in the art to practice the various aspects described herein. In the embodiments, the separation of various system components in the embodiments described above should not be understood as requiring such separation in all embodiments. Various modifications to these aspects will be readily apparent to those skilled in the art, and the generic principles defined herein may be applied to other aspects. Thus, the claims are not intended to be limited to the aspects shown herein, but are to be accorded the full scope consistent with the language claims, wherein reference to an element in the singular is not intended to mean "one and only one" unless specifically so stated, but rather "one or more." Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the subject disclosure.

A phrase such as an "aspect" does not imply that such aspect is essential to the subject technology or that such aspect applies to all configurations of the subject technology. A disclosure relating to an aspect may apply to all configurations, or one or more configurations. A phrase such as an aspect may refer to one or more aspects and vice versa. A phrase such as a "configuration" does not imply that such configuration is essential to the subject technology or that such configuration applies to all configurations of the subject technology. A disclosure relating to a configuration may apply to all configurations, or one or more configurations. A phrase such as a configuration may refer to one or more configurations and vice versa.

All structural and functional equivalents to the elements of the various aspects described throughout this disclosure that are known or later come to be known to those of ordinary skill in the art are expressly incorporated herein by reference and are intended to be encompassed by the claims.

What is claimed is:

1. An apparatus comprising:
   a frame dimensioned to receive a plurality of device carriers;
   a carriage configured to slide within the frame from an insertion position to an extraction position;
   a plate connected to the carriage and configured to slide relative to the carriage from an extended position to a retracted position;
   a plurality of hooks disposed on the plate such that each hook corresponds to a lip of a device carrier of the plurality of device carriers, wherein:
   when the carriage is in the insertion position and the frame is positioned with each hook adjacent to the corresponding lip, and the plate is moved from the extended position to the retracted position, each hook engages its corresponding lip.

2. The apparatus of claim 1 further comprising:
   a plurality of tabs disposed on the plate such that each tab corresponds to a first slot in a latch trigger of a device carrier of the plurality of device carriers, wherein:
   when the carriage is in the insertion position, and the frame is positioned with each hook adjacent to the corresponding lip, and the plate is in the extended position, each tab is within its corresponding first slot in the latch trigger, and
   when each tab is within its corresponding first slot and the plate is moved to the retracted position, each tab moves the latch trigger of the corresponding first slot from a latched position to an unlatched position.

3. The apparatus of claim 2, wherein:
   when each hook engages its corresponding lip and each latch trigger is in the unlatched position, movement of the carriage from the insertion position to the extraction position causes the plurality hooks to draw the plurality of device carriers within the frame.

4. The apparatus of claim 2, wherein each latch trigger includes two first slots and the plurality of tabs includes two tabs for each latch trigger.

5. The apparatus of claim 1, wherein each hook includes a T-nut and each lip is included in a second slot configured to receive the T-nut.

6. The apparatus of claim 5, wherein the second slot configured to receive the T-nut includes a first zone and a second zone narrower than the first zone, the first zone being wider than a head of the T-nut and the second zone being narrower than the head of the T-nut and including the lip.

7. The apparatus of claim 1, wherein the plurality of device carriers includes a row of device carriers within a chassis and the frame is dimensioned to receive the row of device carriers.

8. The apparatus of claim 1 further including a handle attached to the plate, wherein the plate includes third slots that engage first posts extending from the carriage and constrain the sliding of the plate relative to the carriage.

9. The apparatus of claim 1, wherein the frame includes fourth slots that engage second posts extending from the carriage and constrain the sliding of the carriage relative to the frame.

10. The apparatus of claim 9, wherein the frame includes a bar that, when fixed against the frame with the carriage in the extraction position, prevents the carriage from moving to the insertion position.

11. The apparatus of claim 2, wherein the movement of each latch trigger to the unlatched position allows a latch tooth to retract and permit movement of the associated device carrier to from the insertion position to the extraction position.

12. The apparatus of claim 1, wherein the frame is configured to sit atop a chassis such that, when the carriage in the insertion position and the frame is atop the chassis and the plate is in the extended position, each hook is adjacent to the corresponding lip.

13. The apparatus of claim 1, wherein each hook extends from the plate through a corresponding fifth slot in the carriage, the fifth slot configured to allow the hook to move from the extended position to the retracted position.

* * * * *